United States Patent [19]
Hoyt, III et al.

[11] Patent Number: 5,295,911
[45] Date of Patent: Mar. 22, 1994

[54] HORIZONTAL SHEAR MODE FLEXIBLE COUPLING

[76] Inventors: Raymond E. Hoyt, III, 26602 Via Gaviota, Mission Viejo, Calif. 92691; Jerry L. Hauck, 16548 San Andres, Fountain Valley, Calif. 92703; Tom Artunian, 16291 Sundance La., Huntington Beach, Calif. 92649

[21] Appl. No.: 893,708
[22] Filed: Jun. 5, 1992
[51] Int. Cl.⁵ ............................ F16D 3/54; F16D 3/72
[52] U.S. Cl. ..................................... 464/88; 464/154; 464/901
[58] Field of Search .................................... 464/73–75, 464/87, 88, 149, 150, 901, 153, 154

[56] References Cited

U.S. PATENT DOCUMENTS

| | | |
|---|---|---|
| 1,328,366 | 1/1920 | Brown . |
| 1,622,101 | 10/1922 | Francke . |
| 1,952,232 | 12/1930 | Axien . |
| 2,337,287 | 2/1941 | Williams . |
| 2,655,798 | 12/1950 | Neher ................................ 464/154 |
| 2,952,143 | 9/1960 | Case ................................ 464/154 X |
| 3,313,124 | 4/1965 | Filepp ............................. 464/154 X |
| 3,362,191 | 3/1966 | Louette ............................. 464/88 X |
| 3,729,953 | 5/1973 | Wanzer . |
| 3,732,706 | 5/1973 | Evans . |
| 3,834,182 | 9/1974 | Trask et al. . |

FOREIGN PATENT DOCUMENTS

12610/33  11/1933  United Kingdom .
459909    1/1937  United Kingdom .

*Primary Examiner*—Daniel P. Stodola
*Attorney, Agent, or Firm*—Price, Gess & Ubell

[57] ABSTRACT

A flexible coupling for joining two shafts having teeth of a first hub overlapping with teeth of a second hub, the teeth being engaged by projections of a split flexible belt wrapped around the coupling and held in place by a retainer ring.

15 Claims, 1 Drawing Sheet

U.S. Patent  Mar. 22, 1994  5,295,911
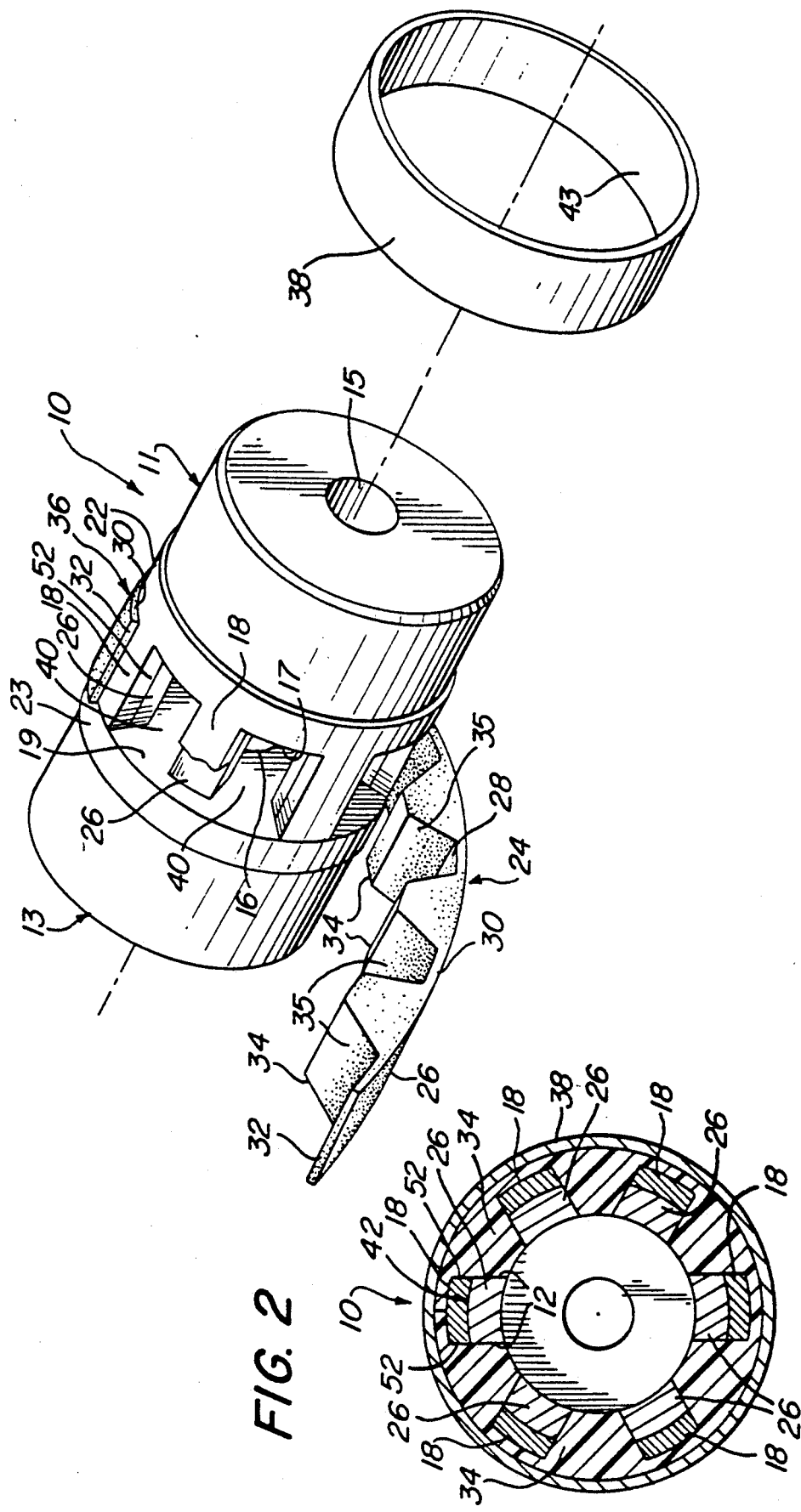

HORIZONTAL SHEAR MODE FLEXIBLE COUPLING

BACKGROUND OF THE INVENTION

1. Field of the Invention

The invention set forth in this specification pertains to new and improved flexible couplings and, more particularly, to such couplings employing an elastomeric belt and operating in a horizontal shear mode.

2. Description of Related Art

Flexible couplings have long been used for transmitting rotation from one shaft to another. Such couplings are normally used in order to accommodate comparatively minor shaft alignment problems such as are occasionally encountered because of manufacturing or assembly errors. Because of the fact that these devices are widely used and have been known and used for many years, many different types of flexible couplings have been proposed, built, and used.

One prior art coupling device includes two hubs or hub elements, each adapted to be connected to a respective one of a pair of generally axially aligned shafts. Each hub is provided with a like number of extending lugs, teeth, fingers, or ribs equally spaced around its periphery. Teeth are of a length such that the hubs can be mounted on their respective shafts with each tooth of the first hub aligned with and slightly spaced apart horizontally from a corresponding tooth of the second hub. The spaces between pairs of opposed teeth are then occupied by corresponding projections on a belt-like motion transmitting means in order to cause the hubs to rotate in synchronism as one of the shafts is rotated. The belts used in these prior art couplings have been flexible, somewhat resilient or elastomeric belts or bands capable of being wrapped around the hubs so that the projections on them engage the teeth on the hubs.

Such couplings operate in what is termed a "vertical shear" mode. This means that the force tending to shear the flexible band or belt has a vertical component, i.e., a component perpendicular to the axis of rotation of the shafts, i.e., the horizontal axis. If overtorqued, the mean and/or vibratory torque will cause a twist angle between the driving and driven hubs, causing an undesirable axial thrust load on the bearings and/or any other rotating parts. Consequently, the longevity of the rotational equipment is impaired.

While the prior art couplings have the drawback of occasioning unwanted wear on machinery, they exhibit several advantages. The elastomeric motion transmitting means or belt provides misalignment capacity and transmits power uniformly. It will fail in severe overloading, protecting the rotational equipment from damage. The elastomeric insert also provides damping, which protects equipment from vibratory strain causing loss of longevity. The coupling design also permits ease of assembly and replacement of inserts.

SUMMARY OF THE INVENTION

Accordingly, it is an object of the invention to provide a flexible coupling which retains the advantages of the prior art vertical shear mode coupling employing an elastomeric belt, while eliminating the problems associated with the vertical shear mode operation of that coupling.

It is a particular object to provide such an improved coupling while avoiding manufacturing complications and added cost and maintaining simplicity of installation and long life.

In accordance with this invention, these various objectives are achieved by providing a flexible coupling for connecting two rotatable shafts which includes two hubs, one of the hubs being capable of being connected to one of the shafts and the other hub being capable of being connected to the other of the shafts. Each of the hubs further includes a plurality of teeth of extended length which overlap one another. A motion transmitting means, such as a flexible split belt, extends generally around the hubs and engages the overlapped teeth and cooperates with the teeth to transmit rotation from one of the hubs to the other. A retaining means is positioned around the motion transmitting means for use in holding the motion transmitting means in contact with the teeth during use of the coupling. The overlapping of the coupling teeth cooperating with the motion transmitting means in effect shifts the shear plane horizontally and eliminates the vertical shear mode of operation.

BRIEF DESCRIPTION OF THE DRAWINGS

The just-summarized invention will now be more fully explained with reference to the accompanying drawings, of which:

FIG. 1 is a perspective view of a flexible coupling according to the preferred embodiment; and FIG. 2 is a cross-sectional view of a flexible coupling in accordance with the preferred embodiment taken at lines 2—2 of FIG. 1.

The particular couplings illustrated in the accompanying drawing are constructed so as to embody the concepts and teachings of this invention summarized and defined in the appended claims. Since these concepts and features may be utilized in a variety of somewhat differently-appearing and differently-constructed flexible couplings through the use of ordinary mechanical engineering skill on the basis of the disclosure embodied in this specification and the accompanying drawings, the invention is not to be considered as being limited to the precise structures illustrated in the drawings and described herein.

DETAILED DESCRIPTION OF THE PREFERRED EMBODIMENTS

In FIG. 1, there is shown a flexible coupling 10 which is normally utilized to mechanically connect two aligned or substantially aligned shafts (not shown). The coupling 10 includes two separate cylindrical hubs 11, 13 of generally annular cross-section. These hubs 11, 13 are provided with centrally-located cylindrical shaft openings 15, 16 which accommodate the respective shafts. These hubs 11, 13 may be secured to the shafts through the use of conventional set screws threaded in the hubs 11, 13 or by other conventional manners well-known in the field. Normally, the precise methods of securing the hubs 11, 13 to the shafts will be dependent upon the size of the coupling 10 and the sizes of the shaft with which it is to be used. If desired, the two openings 15, 16 in the two hubs 11, 13 may differ in dimension so as to accommodate shafts of a different dimension.

When the hubs 11, 13 are mounted as shown they are either in axial alignment or are nearly in axial alignment as shown in FIG. 1, and they are located on their respective shafts so that respective sets of projecting teeth or fingers 18, 26 located on the annular faces 17, 19 of their adjacent ends 22, 23 overlap one another. These teeth 18, 26 will normally be spaced a short distance, e.g., 0.15 inch, from the annular face 17, 19 of the opposing hub 13, 11 by a flexible belt 24 so as to avoid the possibility of abutting against the opposing hub face 13, 11. During installation of the coupling 10 the teeth 18, 26 on the adjacent ends 22 are brought into overlapping relation with one another, for example, through the rotation of one or the other of the respective shafts. When overlapped, gaps 40 are created between the sets or pairs of overlapped teeth 18, 26.

The flexible belt 24 serves as a motion transmitting means for transmitting motion from one hub to the next is assembled on the hubs 11, 13. This belt 24 is preferably formed out of a somewhat flexible, somewhat resilient material capable of transmitting a significant rotational force from one of the hubs, e.g., 11 to the other, e.g. 13, during the use of the coupling 10. Presently preferred results are achieved by forming the belt 24 out of an appropriate polyurethane having the physical properties indicated. It has been found that a urethane material is particularly desirable because it will give or flex sufficiently to accommodate minor misalignment of the shafts 12 without affecting its ability to be utilized over a long period.

As formed, the belt 24 has a generally cylindrical exterior 26, an interior 28, sides or side edges 30, and ends 32 (FIG. 2). The belt 24 will normally be just sufficiently long so that the ends 32 will not quite meet when the belt 24 is located around the teeth 18, 26, as shown. When the belt 24 is in this position, truncated wedge-shaped projections 34 on its interior 28 extend between the overlapped teeth 18, 26 on the hubs 11, 13 as shown, so as to fit closely with respect to all of these teeth 18. 26. These projections 34 can be considered as interior engagement means on the belt 24 which are employed for the purpose of engaging the teeth 18, 26 so as to transmit rotation from one of the hubs 11 to the other of the hubs 13.

In the embodiment pictured in the drawings, the teeth 18 of one hub 11 are identical in number to the teeth 26 of the other hub 13. Each tooth 18 also is sized to overlap the respective underlying tooth 26 without extending over either side edge 12 of the underlying tooth 26. The mating surfaces 42 of the teeth, i.e., the bottom surface of tooth 18 and top surface of tooth 26, are conformingly arcuate in cross-section, as seen in FIG. 2, so as to slide over one another when the hubs 11, 13 are rotated with respect to one another. As a result, the respective pairs of teeth 18, 26 have side edges 12, 52 which align with one another in linear fashion in the cross-section of FIG. 2 and which present a substantially planar face to the planar faces 35 of the wedge-shaped projections 34. The wedge-shaped projections 34 of the belt 24 serve to position the teeth 18, 26 in the conforming, overlapping relation illustrated.

A metal band 38 is used to retain the belt 24. The interior 43 of the band 38 is shaped and dimensioned so that the band 38 may be slid axially relative to the hubs 11, 13 during the assembly and disassembly of the coupling 10 so that the band 38 fits over the belt 24, as shown, when the coupling is assembled so as to conform closely to the exterior 26 of the belt 24 when the belt is installed.

Through overlapping of the teeth as disclosed herein, the vertical shear mode of the prior art coupling is eliminated. The disclosed coupling eliminates undesirable axial thrust load on bearings or other rotating parts, even if overtorqued from mean or vibratory torque common on rotational equipment. Rotational equipment must be protected from axial thrust loads.

In the coupling 10, the interior 40 of the band 38 is cylindrical and may be provided with very small terminal, inwardly-projecting flanges of smaller diameter than the remainder of the interior 40. Such flanges are each generally rectangular in cross-section. In the coupling 10, the sides 30 of the belt 24 fit between these flanges, and the exterior 26 is flat prior to the use of the belt 24 and takes on a cylindrical shape when the belt 24 is used. As a consequence of this structure, when the coupling 10 is employed, the belt 24 will be held in place by being expanded through centrifugal force into contact with the interior 40 of the band 38 generally between the flanges. This coupling 10 may be assembled and disassembled in substantially the manner indicated in the preceding discussion. It will be recognized, however, that a certain minimum difficulty will be encountered in moving the band 38 relative to the belt 24.

When the coupling 10 is not being rotated, it is possible to remove the band 38 by pushing or pounding on it so as to tend to force the belt 24 closely into engagement with the hubs 11, 13 and the teeth 18, 26 to a sufficient extent to permit the band 38 to be slid axially from the belt 24. At this point the belt 24 can be peeled from the hubs 11, 13 while disassembling the coupling 10. As a consequence of the manner in which the band 38 fits with respect to the belt 24, there is no necessity to worry about the precise alignment of a pin or projection with a slot or cavity, as the coupling 10 is assembled by a series of steps which will be obvious from the preceding discussion.

The exterior 26 of the belt 24 may be bowed between the sides 30 so that the medial portion 36 of the belt 24 is of a larger diameter when the belt 24 is used in the coupling 10 than either of the sides 30. In such case, it can be considered that the belt 24 has an outwardly convex shape and that the exterior 26 of it is of uniform cross-sectional configuration throughout the length of this belt 24. The medial portion 36 of this belt 24 may be considered as an exterior engagement means because the shape of this medial portion 36 is important in connection with a metal or other nonelastic retainer band or means 38 used with the coupling 10.

The configuration of this interior portion is such that it is complementary to the exterior 26 of the belt 24. In effect, this interior may be referred to as concave, while the exterior 26 of the belt 24 may be referred to as convex. In any event, because of these complementary configurations of the exterior 26 of the belt 24 and the interior 40 of the band 38, during the use of the coupling the band 38 will be engaged so that it cannot slide off of the belt 24, while concurrently the belt will be held so that it cannot disengage from the teeth 18, 26.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A flexible coupling comprising:
   first and second hubs, each having respective first and second faces;
   first and second pluralities of teeth extending from the respective one of said first and second faces, the teeth on said first face overlapping the teeth of said second fact to form respective pairs of overlapped teeth with respective gaps between respective pairs of overlapped teeth;

a split, flexible belt having openings defining projections thereon, each said projection occupying a respective said gap; and an endless metal retainer band mounted adjacent said belt.

2. The flexible coupling of claim 1, wherein said belt is of a width such that the teeth of said first plurality do not contact said second hub, and the teeth of said second plurality do not contact said first hub.

3. The flexible coupling of claim 2, wherein the teeth are equally spaced around the periphery of each respective face.

4. The flexible coupling of claim 3 wherein said projections are wedge-shaped and wherein said pairs of teeth have sides which align with one another to form a planar surface adjacent the wedge-shaped projections.

5. The flexible coupling of claim 1 wherein said projections are wedge-shaped and wherein said pairs of teeth have sides which align with one another to form a planar surface adjacent the wedge-shaped projections.

6. The flexible coupling of claim 1, wherein the teeth are equally spaced around the periphery of each respective face.

7. A flexible coupling comprising:

first and second hubs, each having respective first and second faces;

first and second pluralities of teeth extending from the respective one of said first and second faces, the teeth on said first face overlapping the teeth of said second face to form respective pairs of overlapped teeth with respective gaps between respective pairs of overlapped teeth;

a motion transmitting means extending generally around the hubs for engaging the overlapped teeth and cooperating with the teeth to transmit rotation from one of the hubs to the other; and a retaining means positioned around the motion transmitting means for holding the motion transmitting means in contact with the teeth.

8. The flexible coupling of claim 7 wherein said motion transmitting means comprises a split, flexible belt having openings defining projections thereon, each said projection occupying a respective said gap.

9. The flexible coupling of claim 8 wherein said retaining means comprises an endless metal retainer band mounted adjacent said belt.

10. The flexible coupling of claim 8 wherein said belt is of a width that the teeth of said first plurality do not contact said second hub, and the teeth of said second plurality do not contact said first hub.

11. The flexible coupling of claim 10 wherein the teeth are equally spaced around the periphery of each respective face.

12. The flexible coupling of claim 11 wherein said projections are wedge-shaped and wherein said pairs of teeth have sides which align with one another to form a planar surface adjacent the wedge-shaped projections.

13. The flexible coupling of claim 8 wherein said projections are wedge-shaped and wherein said pairs of teeth have sides which align with one another to form a planar surface adjacent the wedge-shaped projections.

14. The flexible coupling of claim 13 wherein the teeth are equally spaced around the periphery of each respective face.

15. The flexible coupling of claim 7 wherein the teeth are equally spaced around the periphery of each respective face.

* * * * *